United States Patent
Wei

(10) Patent No.: US 12,231,587 B2
(45) Date of Patent: Feb. 18, 2025

(54) PHYSICAL UNCLONABLE FUNCTION DEVICE AND OPERATION METHOD THEREOF, AND ELECTRONIC DEVICE

(71) Applicants: BEIJING BOE TECHNOLOGY DEVELOPMENT CO., LTD., Beijing (CN); BOE TECHNOLOGY GROUP CO., LTD., Beijing (CN)

(72) Inventor: Xiangye Wei, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/788,523

(22) PCT Filed: Aug. 31, 2021

(86) PCT No.: PCT/CN2021/115755
§ 371 (c)(1),
(2) Date: Jun. 23, 2022

(87) PCT Pub. No.: WO2023/028859
PCT Pub. Date: Mar. 9, 2023

(65) Prior Publication Data
US 2024/0171411 A1    May 23, 2024

(51) Int. Cl.
*H04L 9/32* (2006.01)
*H03K 3/03* (2006.01)
*H03K 3/84* (2006.01)

(52) U.S. Cl.
CPC .......... *H04L 9/3278* (2013.01); *H03K 3/0315* (2013.01); *H03K 3/84* (2013.01)

(58) Field of Classification Search
CPC ............................... H04L 9/3278; H03K 3/84
See application file for complete search history.

(56) References Cited

U.S. PATENT DOCUMENTS

| 7,797,361 B2 | 9/2010 | Lazich et al. |
| 9,379,714 B1 | 6/2016 | Xiu |

(Continued)

FOREIGN PATENT DOCUMENTS

| CN | 1782987 A | 6/2006 |
| CN | 110518906 A | 11/2019 |

(Continued)

OTHER PUBLICATIONS

CN 202180002412.7, Notice of First Review Opinion, Aug. 17, 2024.
EP 21955421, Extended European Search Report, Aug. 5, 2024.

*Primary Examiner* — Ryan J Jakovac
(74) *Attorney, Agent, or Firm* — The Webb Law Firm

(57) ABSTRACT

Provided are a physical unclonable function device and an operation method thereof, and an electronic device. The device includes: a first signal generating circuit configured to generate a first clock signal of n-th period according to a control signal of the n-th period and an input signal of the n-th period; a second signal generating circuit configured to generate a second clock signal of the n-th period according to the control signal of the n-th period and the input signal of the n-th period; an output circuit configured to output an output signal of the n-th period according to the first and second clock signal of the n-th period; and a control circuit configured to process an initial control signal of the n-th period to obtain the control signal of the n-th period according to a reference value comprising a logic level of an output signal of (n−1)-th period.

20 Claims, 7 Drawing Sheets

(56) References Cited

U.S. PATENT DOCUMENTS

| | | | |
|---|---|---|---|
| 9,584,329 | B1 | 2/2017 | Trimberger |
| 2006/0069706 | A1 | 3/2006 | Lazich et al. |
| 2020/0089299 | A1* | 3/2020 | Kim .................. H03L 7/097 |
| 2020/0210628 | A1 | 7/2020 | Karpinskyy et al. |
| 2022/0029627 | A1 | 1/2022 | Wei et al. |
| 2023/0019282 | A1* | 1/2023 | Shin .................. H03K 3/84 |

FOREIGN PATENT DOCUMENTS

| | | |
|---|---|---|
| CN | 110908488 A | 3/2020 |
| CN | 111385091 A | 7/2020 |
| CN | 111666595 A | 9/2020 |
| CN | 111966329 A | 11/2020 |
| CN | 113096709 A | 7/2021 |
| KR | 1020150137375 A | 12/2015 |

* cited by examiner

PHYSICAL UNCLONABLE FUNCTION DEVICE AND OPERATION METHOD THEREOF, AND ELECTRONIC DEVICE

CROSS-REFERENCE TO RELATED APPLICATIONS

This application is a U.S. National Stage Application under 35 U.S.C. § 371 of International Patent Application No. PCT/CN2021/115755, filed on Aug. 31, 2021, the disclosure of which is incorporated by reference herein in its entirety.

TECHNICAL FIELD

The present disclosure relates to a PUF (physical unclonable function) device and an operation method thereof, and an electronic device.

BACKGROUND

With the development of information technology, the security problem of the electronic device is increasingly prominent. The PUF technology is one of the solutions to the security problem, which exhibits high security with a low cost.

SUMMARY

According to one aspect of the embodiments of the present disclosure, a physical unclonable function device is provided. The physical unclonable function device comprises: a first signal generating circuit configured to generate a first clock signal of n-th period according to a control signal of the n-th period and an input signal of the n-th period, where n is an integer greater than or equal to 2; a second signal generating circuit configured to generate a second clock signal of the n-th period according to the control signal of the n-th period and the input signal of the n-th period; an output circuit configured to output an output signal of the n-th period according to the first clock signal of the n-th period and the second clock signal of the n-th period; and a control circuit configured to process an initial control signal of the n-th period to obtain the control signal of the n-th period according to a reference value, the reference value comprising a logic level of an output signal of (n−1)-th period.

In some embodiments, the first signal generating circuit comprises a first time-average-frequency direct period synthesis (TAF-DPS) circuit, and the second signal generating circuit comprises a second TAF-DPS circuit; and the control signal comprises a control word, and the initial control signal comprises an initial control word.

In some embodiments, the initial control word is C=F+r, where F is an integer, and r is a decimal greater than 0 and smaller than 1; and the control word of the n-th period is C(n) which is obtained by performing a mathematical operation on the reference value and at least one of F or r.

In some embodiments, each of the first clock signal and the second clock signal has a first period with a probability of r and a second period with a probability of 1−r, the first period is F+1, and the second period is F.

In some embodiments, C(n)=M+N, where M is one of F and r, and N is obtained by performing the mathematical operation on the reference value and the other of F and r.

In some embodiments, M is F, and N is obtained by performing the mathematical operation on the reference value and r.

In some embodiments, the mathematical operation comprises a multiplication operation.

In some embodiments, $N=\Sigma_{i=1}^{m} B_{\lfloor A(n-i) \rfloor} \cdot r_i$, where m is a number of digits of r after decimal point, $r_i = 0 \cdot p$, p is the last i digits in r, and $B_{\lfloor A(n-i) \rfloor}$ represents a logic level of an output signal of (n−i)-th period; and in a case where n−i is smaller than or equal to 0, $B_{\lfloor A(n-i) \rfloor} = 0$.

In some embodiments, r=0.5.

In some embodiments, each of the first TAF-DPS circuit and the second TAF-DPS circuit is configured to determine the input signal of the n-th period according to the control word of the n-th period.

In some embodiments, the physically unclonable functional device further comprises: a ring oscillator configured to generate K clock signals with a same frequency, wherein there is a same time interval between j-th clock signal and (j−1)-th clock signal, where K is an integer greater than or equal to 2, and j is any integer between 2 and K. The first TAF-DPS circuit comprises: a first accumulator configured to calculate an accumulated value A1(n) of the n-th period in the first accumulator according to following formula: A1(n)=(A1(n−1)+C(n)) (mod K), where A1(n−1) is an accumulated value of (n−1)-th period in the first accumulator, C(n) is the control word of the n-th period, and C(n) is greater than or equal to 2 and smaller than or equal to 2K−1; a first multiplexer; and a first register configured to control the first multiplexer to select one of the K clock signals as the input signal of the n-th period according to an integer in A1(n). The second TAF-DPS circuit comprises: a second accumulator configured to calculate an accumulated value A2(n) of the n-th period in the second accumulator according to following formula: A2(n)=(A2(n−1)+C(n)) (mod K), where A2(n−1) is an accumulated value of the (n−1)-th period in the second accumulator, A2(1)=A1(1), and A2(n)≠A1(n); a second multiplexer; and a second register configured to control the second multiplexer to select the one of the K clock signals as the input signal of the n-th period according to an integer in A2(n), wherein there are positive integers q1 and f1 such that A1(q2) is constantly equal to A1(f2)(mod K), where f1 is greater than q1, and wherein there are positive integers q2 and f2 such that A2(q2) is constantly equal to A2(f2)(mod K), where f2 is greater than q2.

In some embodiments, A2(1)=A1(1), A2(n)≠A1(n), f1=q1, and f2=q2.

In some embodiments, the control circuit is further configured to provide an initial value; and the first register and the second register are further configured to control the first multiplexer and the second multiplexer, respectively, to select a same one of the K clock signals as an input signal of the first period according to the initial value.

In some embodiments, the control circuit is further configured to provide the same frequency.

In some embodiments, the first signal generating circuit is further configured to generate a first clock signal of a first period according to a control signal of the first period and an input signal of the first period; the second signal generating circuit is further configured to generate a second clock signal of the first period according to the control signal of the first period and the input signal of the first period; and the output circuit is further configured to output an output signal of the first period according to the first clock signal of the first period and the second clock signal of the first period.

In some embodiments, c-th rising edge of the first clock signal reaches the output circuit at a first time, and c-th rising edge of the second clock signal reaches the output circuit at a second time, where c is an integer greater than or equal to 1; and the output circuit is configured to determine a logic level of the output signal of the n-th period according to at least the first time and the second time.

In some embodiments, (c+1)-th rising edge of the first clock signal reaches the output circuit at a third time, and (c+1)-th rising edge of the second clock signal reaches the output circuit at a fourth time; and the output circuit is configured to determine the logic level of the output signal of the n-th period according to a first difference between the third time and the first time, and a second difference between the fourth time and the second time.

In some embodiments, in a case where the first difference value is greater than or equal to the second difference value, the logic level of the output signal of the n-th period is 1; and in a case where the first difference value is smaller than the second difference value, the logic level of the output signal of the n-th period is 0.

In some embodiments, a probability that the logic level of the output signal is a first logic level is 0.5, a probability that the logic level of the output signal is a second logic level is 0.5, and the first logic level and the second logic level have opposite logics.

According to another aspect of the embodiments of the present disclosure, provided is an electronic device, comprising the physical unclonable function device according to any of the above embodiments.

In some embodiments, the electronic device comprises a display device.

According to still another aspect of the embodiments of the present disclosure, provided is an operation method of a physically unclonable functional device, comprising: processing, by a control circuit, an initial control signal of n-th period according to a reference value to obtain a control signal of the n-th period, wherein the reference value comprises a logic level of an output signal of (n−1)-th period, and n is greater than or an integer equal to 2; generating, by a first signal generating circuit, a first clock signal of the n-th period according to the control signal of the n-th period and an input signal of the n-th period; generating, by a second signal generating circuit, a second clock signal of the n-th period according to the control signal of the n-th period and the input signal of the n-th period; and outputting, by an output circuit, an output signal of the n-th period according to the first clock signal of the n-th period and the second clock signal of the n-th period.

According to yet still another aspect of the embodiments of the present disclosure, provided is an encryption method, comprising encrypting data to be encrypted using the output signal of the physical unclonable function device according to any of the above embodiments.

BRIEF DESCRIPTION OF THE ACCOMPANYING DRAWINGS

The accompanying drawings which constitute part of this specification, illustrate the exemplary embodiments of the present disclosure, and together with this specification, serve to explain the principles of the present disclosure.

The present disclosure may be more explicitly understood from the following detailed description with reference to the accompanying drawings, in which.

Figure 1:
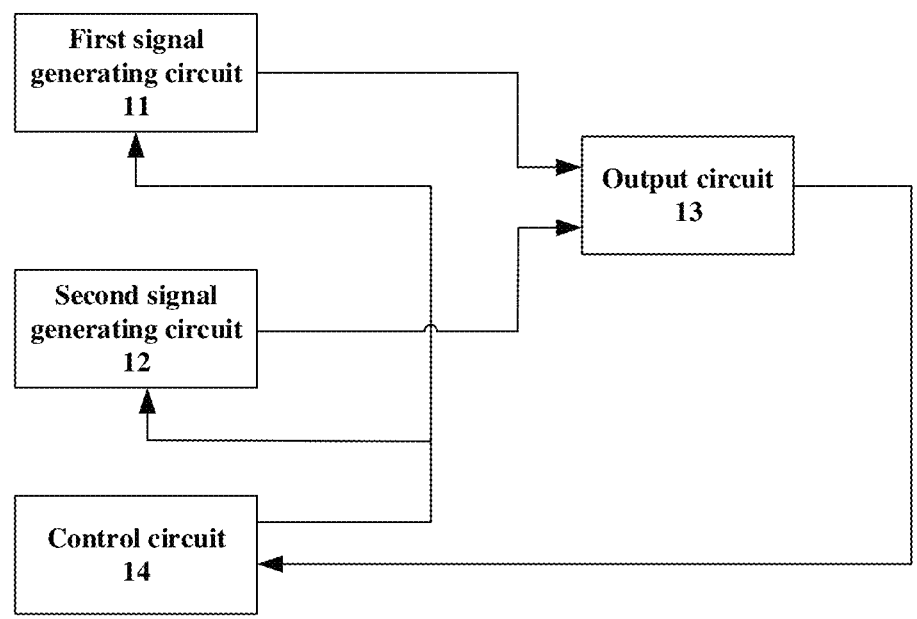
FIG. 1 is a schematic structural view showing a PUF device according to an embodiment of the present disclosure.

It should be understood that the dimensions of various parts shown in the accompanying drawings are not necessarily drawn according to actual proportional relations. In addition, the same or similar components are denoted by the same or similar reference signs.

DETAILED DESCRIPTION

Various exemplary embodiments of the present disclosure will now be described in detail with reference to the accompanying drawings. The following description of the exemplary embodiments is merely illustrative and is in no way intended as a limitation to the present disclosure, its application or use. The present disclosure may be implemented in many different forms, which are not limited to the embodiments described herein. These embodiments are provided to make the present disclosure thorough and complete, and fully convey the scope of the present disclosure to those skilled in the art. It should be noticed that: relative arrangement of components and steps, material composition, numerical expressions, and numerical values set forth in these embodiments, unless specifically stated otherwise, should be explained as merely illustrative, and not as a limitation.

The use of the terms "first", "second" and similar words in the present disclosure do not denote any order, quantity or importance, but are merely used to distinguish between different parts. A word such as "comprise", "have" or variants thereof means that the element before the word covers the element(s) listed after the word without excluding the possibility of also covering other elements. The terms "up", "down", or the like are used only to represent a relative positional relationship, and the relative positional relationship may be changed correspondingly if the absolute position of the described object changes.

In the present disclosure, when it is described that a specific component is disposed between a first component and a second component, there may be an intervening component between the specific component and the first component or between the specific component and the second component. When it is described that a specific part is connected to other parts, the specific part may be directly connected to the other parts without an intervening part, or not directly connected to the other parts with an intervening part.

Unless otherwise defined, all terms (including technical and scientific terms) used herein have the same meanings as the meanings commonly understood by one of ordinary skill in the art to which the present disclosure belongs. It should also be understood that terms as defined in general dictionaries, unless explicitly defined herein, should be interpreted as having meanings that are consistent with their meanings in the context of the relevant art, and not to be interpreted in an idealized or extremely formalized sense.

Techniques, methods, and apparatus known to those of ordinary skill in the relevant art may not be discussed in detail, but where appropriate, these techniques, methods, and apparatuses should be considered as part of this specification.

FIG. 1 is a schematic structural view showing a PUF device according to an embodiment of the present disclosure.

As shown in FIG. 1, the PUF device comprises a first signal generating circuit 11, a second signal generating circuit 12, an output circuit 13 and a control circuit 14.

The first signal generating circuit 11 is configured to generate a first clock signal of n-th period according to a control signal of the n-th period and an input signal of the n-th period. Here, n is an integer greater than or equal to 2. In some embodiments, the control signal comprises a control word. It can be understood that, the control word may be an integer, or may comprise an integer part and a decimal part.

In some embodiments, the first signal generating circuit 11 comprises a first TAF-DPS (Time-Average-Frequency Direct Period Synthesis) circuit 11. For example, the first TAF-DPS circuit selects one of a plurality of clock signals as the input signal of the n-th period, and the first clock signal of the n-th period is obtained after the input signal of the n-th period passes through a TFF (toggle Flip Flop, flip flip-flop) in the first TAF-DPS circuit. For example, the first TAF-DPS circuit 11 selects one of a plurality of clock signals as the input signal of the n-th period according to the control word of the n-th period.

The second signal generating circuit 12 is configured to generate a second clock signal of the n-th period according to the control signal of the n-th period and the input signal of the n-th period.

In some embodiments, the second signal generating circuit 12 comprises a second TAF-DPS circuit. Similarly, for example, the second TAF-DPS circuit selects one of a plurality of clock signals as the input signal of the n-th period, and the first clock signal of the n-th period is obtained after the input signal of the n-th period passes through a TFF in the second TAF-DPS circuit.

The output circuit 13 is configured to output an output signal of the n-th period according to the first clock signal of the n-th period and the second clock signal of the n-th period.

In some embodiments, the output circuit 13 may determine whether the logic level of the output signal of each period is 0 or 1 according to the time when the first clock signal and the second clock signal reach the output circuit 13, which will be described in detail hereinafter in conjunction with different implementations. It can be understood that, the time when the first clock signal of the n-th period and the second clock signal of the n-th period reach the output circuit 13 is unpredictable, so the logic level of the output signal is also unpredictable, that is, random.

The control circuit 14 is configured to process an initial control signal of the n-th period according to a reference value to obtain the control signal of the n-th period. Here, the reference value comprises at least the logic level of the output signal of (n–1)-th period. In some embodiments, the probability that the logic level of the output signal is a first logic level is 0.5, the probability that the logic level of the output signal is a second logic level is 0.5. The first logic level and the second logic level have opposite logics. For example, the first logic level is 0 and the second logic level is 1, vice versa.

For example, the initial control signal is generated by the control circuit 14. It should be noted that, initial control signals of different periods may be the same or different. For example, the initial control signals of some periods are the same, and different from the initial control signals of other periods. For another example, the initial control signals of all periods are the same, that is, the initial control signals are no longer changed once generated.

In some embodiments, the reference value comprises only the logic level of the output signal of the (n–1)-th period. In this case, the control circuit 14 processes the initial control signal of the n-th period only according to the logic level of the output signal of the previous period to obtain the control signal of the current period.

In other embodiments, the reference value also comprises other values other than the logic level of the output signal of the (n–1)-th period. For example, the reference value also comprises the logic level of the output signal of the (n–2)-th period, the logic level of the output signal of the (n–3)-th period, or the like. In this case, the control circuit 14 may process the initial control signal of the n-th period according to the logic levels of output signals of a plurality of periods before the current period to obtain the control signal of the current period.

In some embodiments, the initial control signal comprises an initial control word. For example, the processing to the initial control word of the n-th period may comprise various mathematical operations, for example, multiplication operation, addition operation, or the like.

In the above embodiments, the control circuit processes the initial control signal of the current period according to the reference value comprising the logic level of the output signal of the previous period to obtain the control signal of the current period. The logic level of the output signal of the PUF device is unpredictable. The logic level of the output signal of the previous period is introduced into the control signal of the current period, which increases the unpredictability of the control signal of the current period. In this way, the unpredictability of the first clock signal and the second clock signal generated based on the control signal of the current period is increased, thereby increasing the randomness and unpredictability of the output signal of the current period, and improving the security of the PUF device.

It should be understood that, the first signal generating circuit 11 and the second signal generating circuit 12 may be implemented in different ways. In some embodiments, the first signal generating circuit 11 comprises a first TAF-DPS circuit, and the second signal generating circuit 12 comprises a second TAF-DPS circuit. Correspondingly, the control signal may comprise a control word, and the initial control signal may comprise an initial control word. With the TAF-DPS circuit as the signal generating circuit, the randomness and unpredictability of the output signal is further increased, and the security of the PUF device is further improved.

Some implementations of processing the initial control word according to the reference value will be described below in conjunction with different embodiments.

In some embodiments, the initial control word $C=F+r$, where F is an integer, and r is a decimal greater than 0 and smaller than 1. The control word $C(n)$ of the n-th period is obtained by performing mathematical operation on the reference value and at least one of F or r. Here, it can be understood that, r will affect the periods of the first clock signal and the second clock signal.

In some embodiments, each of the first clock signal and the second clock signal has a first period with a probability of r and a second period with a probability of 1−r. The first period is F+1, and the second period is F. The larger r is, the higher the proportion of the first period will be.

As some implementations, the control word C(n) of the n-th period is obtained by performing mathematical operation on the reference value and each of F and r. In other words, the control word C(n) of the n-th period is obtained after F and r are both mathematically operated with the reference value.

As other implementations, the control word C(n) of the n-th period is obtained by performing mathematical operation on the reference value and one of F and r. For example, the control word of the n-th period is C(n)=M+N, where M is one of F and r, and N is obtained by performing mathematical operation on the reference value and the other of F and r. In this way, the security of the PUF device is enhanced with less cost.

In some cases, the area occupied by the PUF device is restricted. In some embodiments, in order to enhance much more security using the PUF device in the case of limited area, M is F, and N is obtained by performing mathematical operation on r and the reference value. In other words, the reference value only affects the value of the decimal part of the initial control word, and not affects the value of the integer part of the initial control word. In this way, the control circuit 14 can be implemented with a simple structure. On one hand, the security of the PUF device can be improved; on the other hand, due to the simple structure, the area occupied by the control circuit 14 in the PUF device and the power consumption of the PUF device both can be reduced.

In a case where the control word of the n-th period C(n)=F+N, the above mathematical operation may comprise a multiplication operation. Some implementations of calculating N will be provided below.

In some implementations, $N=B_{\lfloor A(n-1) \rfloor} \times r$. In this case, the control word of the n-th period $C(n)=F+B_{\lfloor A(n-1) \rfloor} \times r$. Here, $B_{\lfloor A(n-1) \rfloor}$ is the logic level of the output signal of the (n−1)-th period.

In other implementations, $N=\Sigma_{i=1}^{m} B_{\lfloor A(n-i) \rfloor} \cdot r_i$. In this case, the control word of the n-th period $C(n)=F+\Sigma_{i=1}^{m} B_{\lfloor A(n-i) \rfloor} \cdot r_i$.

Here, m is the number of digits of r after decimal point, $r_i=0 \cdot p$, p is the last i digit in r, and $B_{\lfloor A(n-i) \rfloor}$ represents the logic level of the output signal of the n−ith period. Further, in a case where n−i is smaller than or equal to 0, $B_{\lfloor A(n-i) \rfloor}=0$. As an example, if r=0.125, then r1=0.5, r2=0.25, and r3=0.125.

In this way, the randomness and unpredictability of the output signal of the PUF device can be further improved, thereby further improving the security of the PUF device.

In some embodiments, in the case where the control word C(n)=F+N of the n-th period, r=0.5. In this way, the randomness and unpredictability of the output signal of the PUF device can be still further improved, thereby still further improving the security of the PUF device.

In some embodiments, each of the first TAF-DPS circuit 11 and the second TAF-DPS circuit 12 is configured to determine the input signal of the n-th period according to the control word of the n-th period. In this way, the control word of the n-th period is random, so that the input signal of the n-th period is also random.

Figure 2:
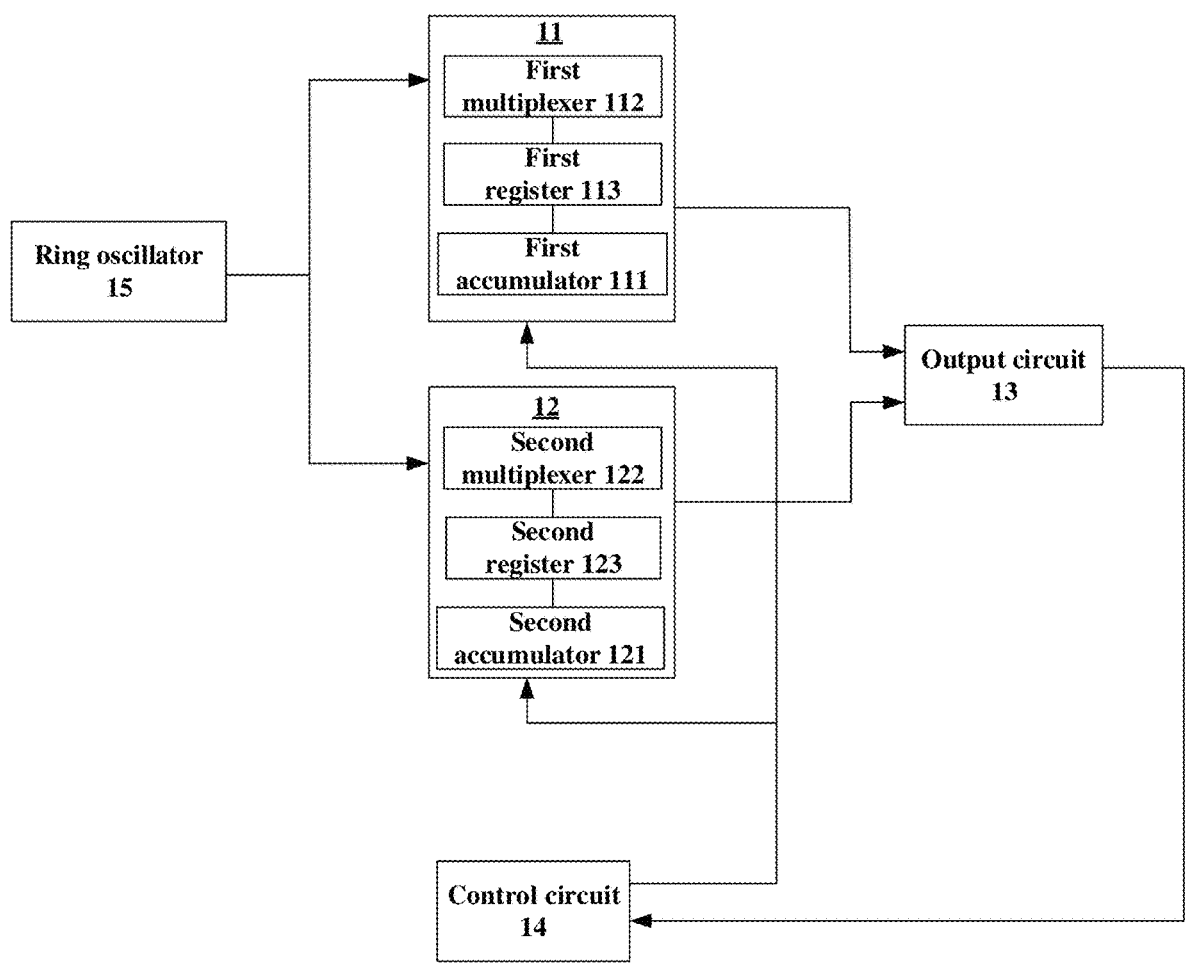
FIG. 2 is a schematic structural view showing a PUF device according to another embodiment of the present disclosure.

FIG. 2 is a schematic structural view showing a PUF device according to another embodiment of the present disclosure.

Compared to FIG. 1, the PUF device shown in FIG. 2 also comprises a ring oscillator 15. In addition, the first signal generating circuit 11 comprises a first TAF-DPS circuit, and the second signal generating circuit 11 comprises a second TAF-DPS circuit. The first TAF-DPS circuit comprises a first accumulator 111, a first multiplexer 112 and a first register 113, and the second TAF-DPS circuit comprises a second accumulator 121, a second multiplexer 122 and a second register 123.

The ring oscillator 15 is configured to generate K clock signals with a same frequency, where K is an integer greater than or equal to two. There is a same time interval between the j-th clock signal and the (j−1)-th clock signal, where j is any one integer between 2 and K. For example, in a case where K is 4, j may be 2, 3 and 4.

For example, the time interval between the first clock signal and the second clock signal, the time interval between the second clock signal and the third clock signal . . . and the time interval between the K-th clock signal and the (K−1)-th clock signal are the same. In some embodiments, the control circuit 14 is further configured to provide the same frequency. The ring oscillator 15 generates corresponding K clock signals according to the same frequency provided by the control circuit 14.

The first accumulator 111 is configured to calculate the accumulated value A1(n) of the n-th period in the first accumulator 111 according to the formula 1 below:

$$A1(n)=(A1(n-1)+C(n))(\bmod K) \quad \text{(formula 1)}.$$

Here, A1(n−1) is the accumulated value of the (n−1)-th period in the first accumulator 111. In some embodiments, an initial value of the accumulated value in the first accumulator 111 is 0, and the accumulated value of the first period in the first accumulator is A1(1) which equals to the initial control word. For example, the control circuit 14 generates the initial control word and then provides the initial control word to the first accumulator 111.

C(n) is the control word of the n-th period, and C(n) is greater than or equal to 2 and smaller than or equal to 2K−1. C(n) may be determined according to multiple ways introduced above, which will not be described in detail here.

For the formula 1, there are positive integers q1 and f1 such that A1(q1) is constantly equal to A1(f1)(mod K), and f1 is greater than q1. That is, the f1 can be regarded as the recursive period of the chaotic recursive equation shown in the formula 1.

The first register 113 is configured to control the first multiplexer 112 to select one of the K clock signals as the input signal of the n-th period according to the integer in A1(n). For example, if the integer in A1(3) is 3, the first multiplexer 112 may select the fourth clock signal as the input signal of the third period.

The second accumulator 121 is configured to calculate the accumulated value A2(n) of the n-th period in the second accumulator 121 according to the following formula 2:

$$A2(n)=(A2(n-1)+C(n))(\bmod K) \quad \text{(formula 2)}.$$

Here, A2(n−1) is the accumulated value of the (n−1)-th period in the second accumulator 121. In some embodiments, an initial value of the accumulated value in the second accumulator 121 is 0, and the accumulated value of the first period in the second accumulator 121 is A2(1)=A1(1), which equals to the initial control word.

Likewise, for the formula 2, there are positive integers q2 and f2 such that A2(q2) is constantly equal to A2(f2)(mod K). The f2 can be regarded as the recursive period of the chaotic recursive equation shown in the formula 2.

The second register 123 is configured to control the second multiplexer 122 to select one of the K clock signals as the input signal of the n-th period according to the integer in A2(n). In some embodiments, the clock signal selected by the second multiplexer 122 is the same as the clock signal selected by the first multiplexer 112.

In the above embodiments, since the logic level of the output signal of the previous period is random, the control word of the current period is also random, so that the accumulated values in the first accumulator and the second accumulator are random, and the clock signals selected by the first multiplexer and the second multiplexer are random. Finally, the first clock signal and the second clock signal are also random, thereby increasing the randomness and unpredictability of the output signal and improving the security of the PUF device.

In some embodiments, A2(1)=A1(1), A2(n)=A1(n), q2=q1, and f2=f1. In this case, for each period, the values accumulated in the first accumulator 111 and the second accumulator 121 are the same, so that the recursive periods of the chaotic recursive equations shown in the formulas 1 and 2 are the same. In this way, the clock signal selected by the second multiplexer 122 is the same as the clock signal selected by the first multiplexer 112. Accordingly, the logic level of the output signal output by the PUF device based on the same input signal is more random, and the randomness of the output signal of the PUF output device is further improved, thereby further improving the security of the PUF device.

In some embodiments, the control circuit 14 is further configured to provide an initial value; and the first register 113 and the second register 123 are further configured to control the first multiplexer 112 and the second multiplexer to select a same clock signal from the K clock signals as the input signal of the first period respectively, according to the initial value provided by the control circuit 14. It should be understood that, the first register 113 is configured to control the first multiplexer 112 to select the same clock signal from the K clock signals as the input signal of the first period according to the initial value provided by the control circuit 14, and the second register 123 is configured to control the second multiplexer 122 to select the same clock signal from the K clock signals as the input signal of the first period according to the initial value provided by the control circuit 14.

It should be noted that, the initial value here may be set according to actual conditions. For example, the initial value is 1, and each of the first multiplexer 112 and the second multiplexer 122 may select the second clock signal as the input signal of the first period.

In some embodiments, the first signal generating circuit 11 is further configured to generate a first clock signal of the first period according to a control signal of the first period and an input signal of the first period; the second signal generating circuit 12 is further configured to generate a second clock signal of the first period according to the control signal of the first period and the input signal of the first period; and the output circuit 13 is further configured to generate an output signal of the first period according to the first clock signal of the first period and the second clock signal of the first period. For example, the control word of the first period is the initial control word generated by the control circuit 14.

Figure 3A:
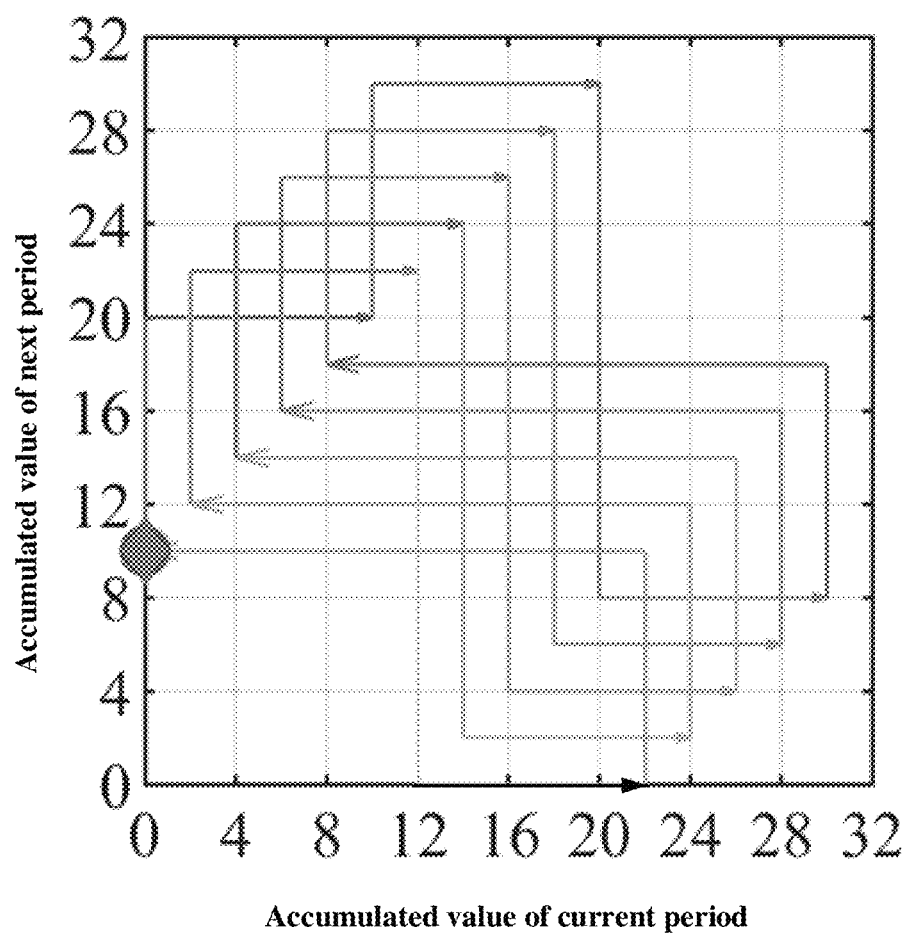
FIGS. 3A and 3B show variations of an accumulated value of the accumulator under different conditions according to some embodiments of the present disclosure.
Figure 3B:
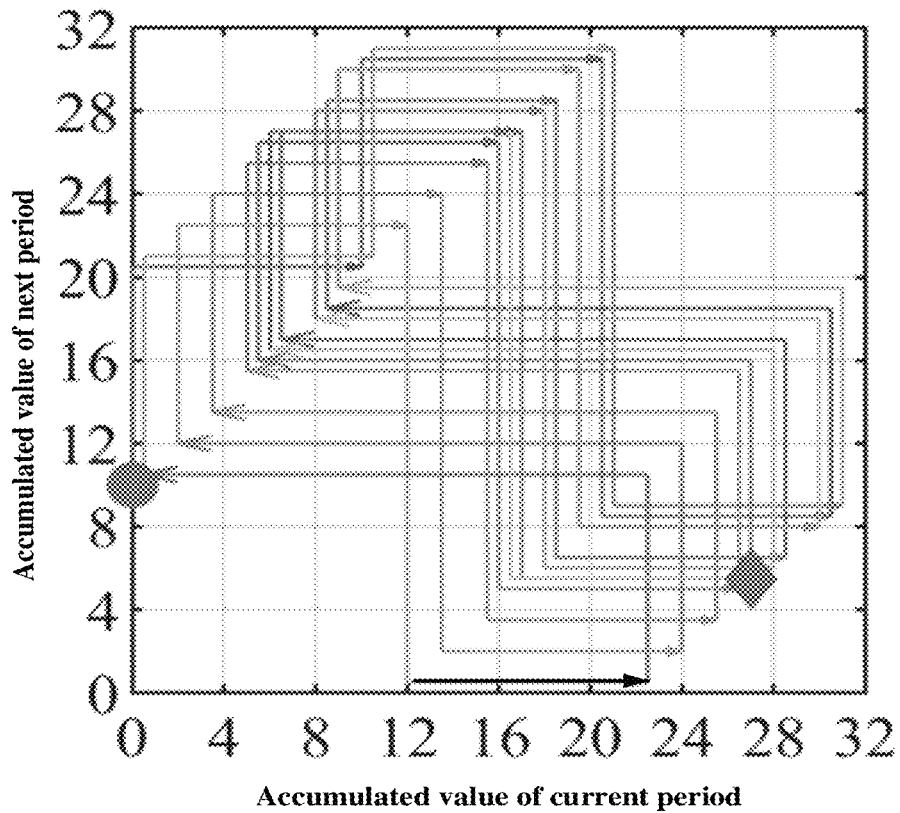

FIGS. 3A and 3B show variations of accumulated values of the first accumulator and the second accumulator under different conditions according to some embodiments of the present disclosure. Here, it is assumed that the accumulated values of the control word in the first accumulator and the second accumulator are the same, the number of the clock signals is K=32, the integer of the initial control word is F=42, and the initial value provided by the control circuit 14 is 0.

The horizontal ordinate corresponding to the position of each arrow in FIGS. 3A and 3B is the accumulated value of the current period, and the vertical ordinate corresponding to the position of each arrow is the accumulated value of the next period.

In the case shown in FIG. 3A, the initial control word is not processed according to the reference value, and the accumulated value each time is the same. It can be seen from FIG. 3A that, the accumulated value changes regularly. When the accumulated value becomes the initial value of 0 again, the accumulated value will change cyclically according to the regularity shown in FIG. 3A, with a constant period.

In the case shown in FIG. 3B, the initial control word is processed according to the reference value, and the value accumulated each time is random. It can be seen from FIG. 3B that, the accumulated value changes randomly, and changes more complicated, and the period is no longer constant. The accumulated value entering the cycle (rhombus point) is not necessarily the initial value of 0.

It can be known from the above comparative analysis that, with the PUF device according to the embodiments of the present disclosure, the response to the excitation of the control word becomes more unpredictable and has the enhanced complexity and randomness.

It should be noted that, the output circuit 13 in FIGS. 1 and 2 may be implemented by different structures, for example, a D flip-flop, a bang-bang frequency discriminator, or the like. It can be understood that, due to the deviation in the process, for the same input signal, the first clock signal and the second clock signal obtained after processing the same input signal by the first TAF-DPS 11 and the second TAF-DPS 12 with the same structure reach the output circuit 13 at different times. Therefore, the output circuit 13 can encode accordingly.

The implementations of determining the logic level of the output signal of the n-th period by the output circuit 13 will be described below in conjunction with some embodiments.

In some embodiments, the c-th rising edge of the first clock signal reaches the output circuit 13 at a first time, and the c-th rising edge of the second clock signal reaches the output circuit 13 at a second time, where c is an integer greater than or equal to 1. In this case, the output circuit 13 is configured to determine the logic level of the output signal of the n-th period according to at least the first time and the second time. For example, the output circuit 13 may comprise a D flip-flop.

For example, if the difference between the second time and the first time is greater than or equal to 0, the logic level of the output signal of the n-th period is 1; and if the difference between the second time and the first time is smaller than 0, the logic level of the output signal of the n-th period is 0.

In other embodiments, the c-th rising edge of the first clock signal reaches the output circuit 13 at a first time, the c-th rising edge of the second clock signal reaches the output circuit 13 at a second time, the (c+1)-th rising edge of the first clock signal reaches the output circuit 13 at a third time, and the (c+1)-th rising edge of the second clock signal reaches the output circuit 13 at a fourth time. In this case, the output circuit 13 is configured to determine the logical level of the output signal of the n-th period according to a first difference between the third time and the first time, and a second difference between the fourth time and the second time. For example, the output circuit 13 may comprise a bang-bang frequency discriminator.

For example, in a case where the first difference is greater than or equal to the second difference, the logic level of the output signal of the n-th period is 1; and in a case where the first difference is smaller than the second difference, the logic level of the output signal of the n-th period is 0.

It should be understood that, the above coding manner is not restrictive, and the output circuit 14 may also perform coding according to other manners, which will not be exhaustive here.

Figure 4:
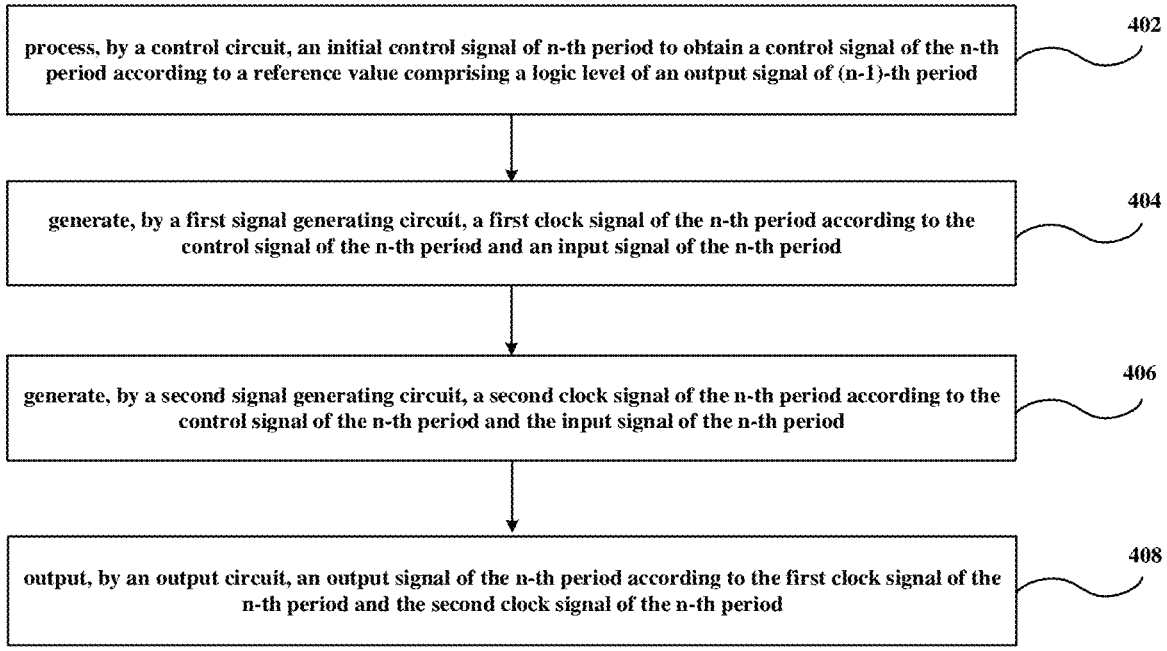
FIG. 4 is a schematic flowchart showing an operation method of a PUF device according to an embodiment of the present disclosure.
Figure 5A:
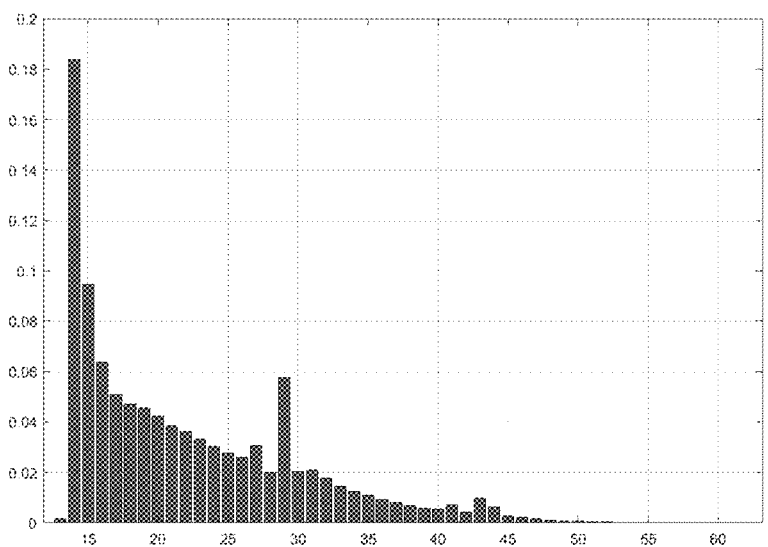
FIGS. 5A-5F show distribution of recursive periods according to some embodiments of the present disclosure.
Figure 5B:
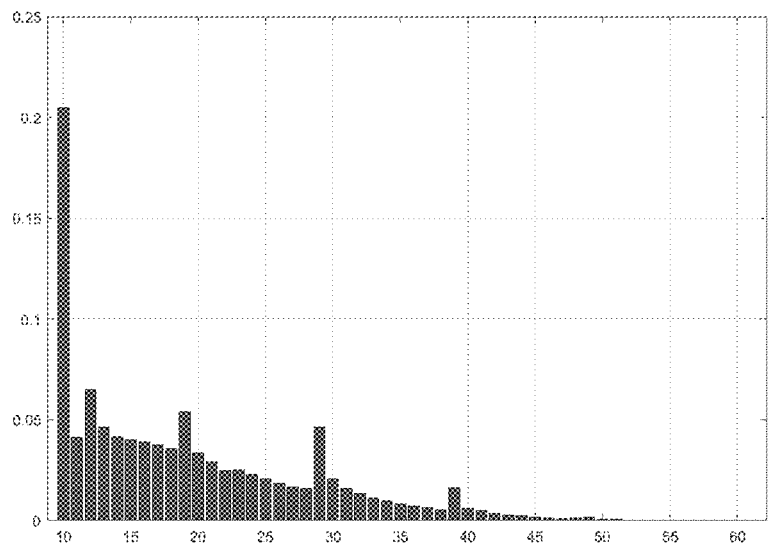
Figure 5C:
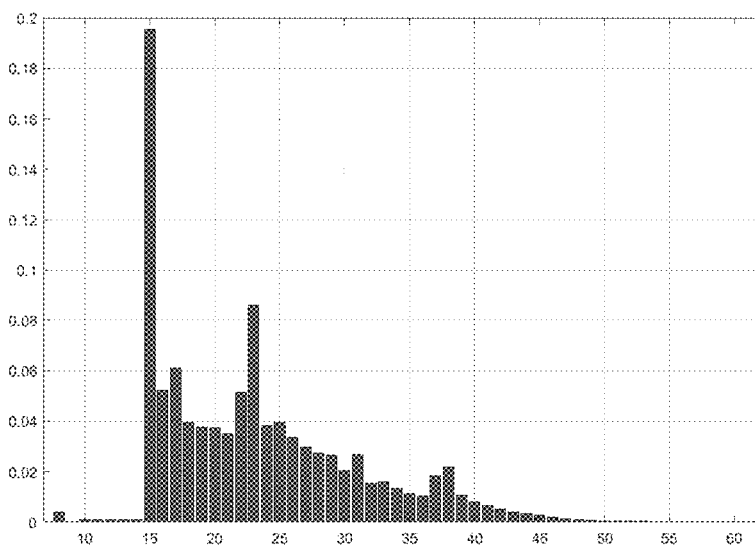
Figure 5D:
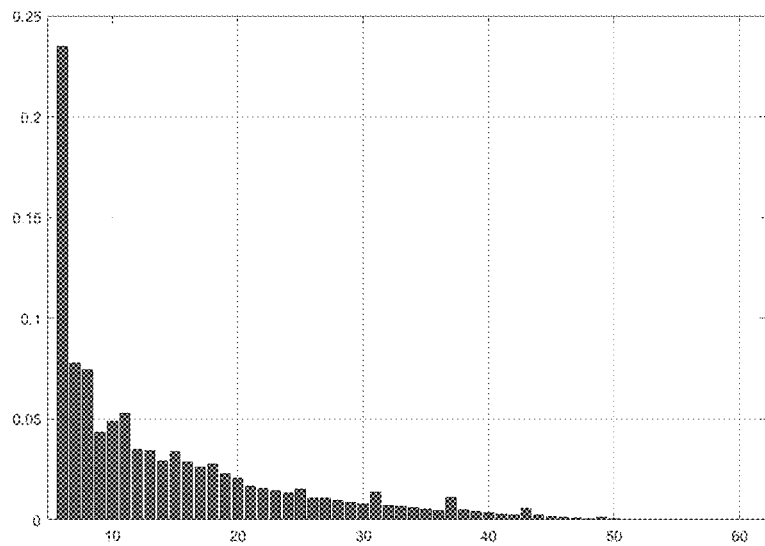
Figure 5E:
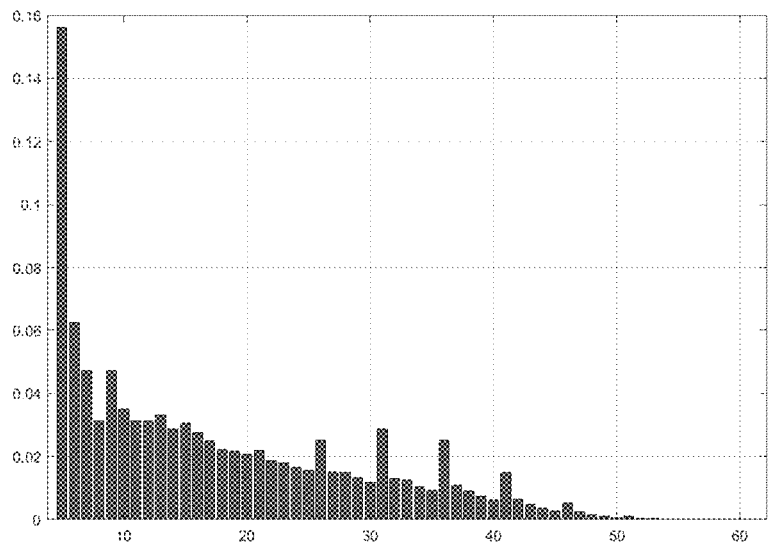
Figure 5F:
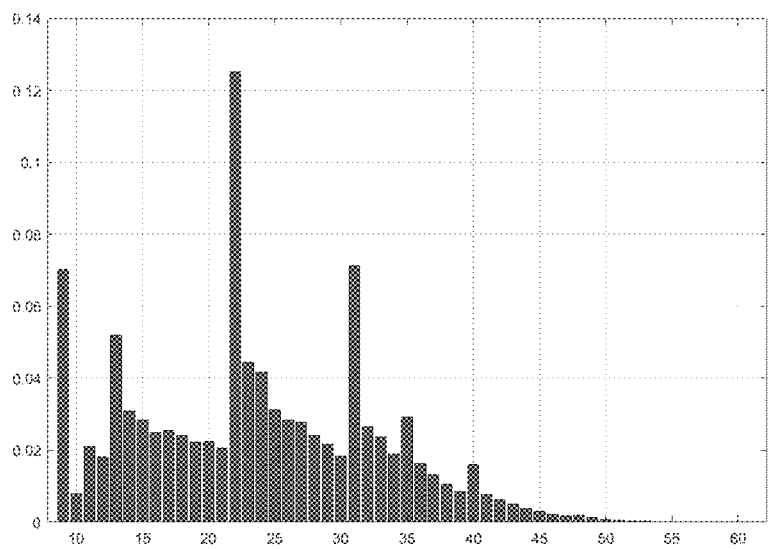

FIG. 4 is a schematic flowchart showing an operation method of a PUF device according to an embodiment of the present disclosure.

At step 402, an initial control signal of n-th period is processed by a control circuit, according to a reference value to obtain a control signal of the n-th period. Here, the reference value comprises the logic level of an output signal of the (n−1)-th period, where n is an integer greater than or equal to 2.

At step 404, a first clock signal of the n-th period is generated by a first signal generating circuit, according to the control signal of the n-th period and an input signal of the n-th period.

At step 406, a second clock signal of the n-th period is generated by the second signal generating circuit, according to the control signal of the n-th period and the input signal of the n-th period.

At step 408, an output signal of the n-th period is output by an output circuit, according to the first clock signal of the n-th period and the second clock signal of the n-th period.

It should be understood that, the PUF device may perform operation in the method described above, and will not be described in detail here.

In the above embodiments, the control circuit processes the initial control signal of the current period according to the reference value comprising the logic level of the output signal of the previous period to obtain the control signal of the current period. The logic level of the output signal of the PUF device is unpredictable. The logic level of the output signal of the previous period is introduced into the control signal of the current period, which increases the unpredictability of the control signal of the current period. In this way, the unpredictability of the first clock signal and the second clock signal generated based on the control signal of the current period is increased, thereby increasing the randomness and unpredictability of the output signal of the current period, and improving the security of the PUF device.

The embodiments of the present disclosure also provide an encryption method comprising encrypting data to be encrypted using the output signal of the PUF device according to any of the above embodiments. Here, the data to be encrypted may be any data to be encrypted. For example, the data to be encrypted may be encrypted using the output signal of the PUF device as a key.

The embodiments of the present disclosure also provide an electronic device comprising the physical unclonable function device according to any of the above embodiments. In some embodiments, the electronic device comprises a display device. For example, the display device may be any product or component with a display function, such as a mobile terminal, an IoT (Internet of Things) terminal, a television, a monitor, a notebook computer, a digital photo frame, a navigator, or an electronic paper.

Some examples will be provided below to explain the variation of the recursion period f in the formulas 1 and 2 mentioned above.

Table 1 shows the distribution of the recursion period f of the formulas 1 and 2 in a case where the number of clock signals is K=4, the decimal part of the initial control word is 0.5, and the integer part of the initial control word is F ranging from 2 to 7.

TABLE 1

| | K = 4, r = 0.5 | | |
|---|---|---|---|
| F | q | Probability | Expectation |
| 2 | 2 | 1/4 | 5.25 |
|   | 4 | 1/16 |   |
|   | 5 | 3/16 |   |
|   | 6 | 1/8 |   |
|   | 7 | 3/16 |   |
|   | 8 | 3/16 |   |
| 3 | 4 | 1/16 | 6.6875 |
|   | 5 | 1/16 |   |
|   | 6 | 1/4 |   |
|   | 7 | 3/8 |   |
|   | 8 | 1/4 |   |
| 4 | 1 | 1/2 | 2.8125 |
|   | 3 | 1/4 |   |
|   | 5 | 1/8 |   |
|   | 7 | 1/16 |   |
|   | 8 | 1/16 |   |
| 5 | 3 | 3/8 | 5 |
|   | 4 | 3/16 |   |
|   | 5 | 1/16 |   |
|   | 7 | 3/16 |   |
|   | 8 | 3/16 |   |
| 6 | 2 | 1/4 | 5.25 |
|   | 4 | 1/16 |   |
|   | 5 | 3/16 |   |
|   | 6 | 1/8 |   |
|   | 7 | 3/16 |   |
|   | 8 | 3/16 |   |
| 7 | 4 | 1/16 | 6.6875 |
|   | 5 | 1/16 |   |
|   | 6 | 1/4 |   |
|   | 7 | 3/8 |   |
|   | 8 | 1/4 |   |
| $F \in \{2, 3, 4, 5, 6, 7\}$ |   | 1 | 5.28125 |

FIGS. 5A-5F show distribution of recursive cycles according to some embodiments of the present disclosure. In these embodiments, the number of clock signals is K=32, the decimal part of the initial control word is 0.5, and the integer part of the initial control word corresponding to FIGS. 5A-5F is F which is 2 to 7 respectively.

In FIGS. 5A-5F, the horizontal ordinate represents the recursive period f, and the vertical ordinate represents the probability that the recursive period f is a corresponding value.

It can be seen from Table 1 and FIGS. 5A-5F that, in a case where F is a different value, the recursive period f changes randomly, not as a constant value.

In practical applications, the changing complexity of the recursive period f can be adjusted by adjusting the value of r. For example, the output signal of the PUF device constitutes K bits as a key, and when the recursive period f satisfies $\sqrt{f} \geq K$, it can be considered that the PUF device is safe.

Hereto, various embodiments of the present disclosure have been described in detail. Some details well known in the art are not described to avoid obscuring the concept of the present disclosure. According to the above description, those skilled in the art would fully know how to implement the technical solutions disclosed herein.

Although some specific embodiments of the present disclosure have been described in detail by way of examples, those skilled in the art should understand that the above examples are only for the purpose of illustration and are not intended to limit the scope of the present disclosure. It should be understood by those skilled in the art that modifications to the above embodiments and equivalently substitution of part of the technical features can be made without departing from the scope and spirit of the present disclosure. The scope of the disclosure is defined by the following claims.

What is claimed is:

1. A physical unclonable function device, comprising:
   a first signal generating circuit configured to generate a first clock signal of n-th period according to a control signal of the n-th period and an input signal of the n-th period, where n is an integer greater than or equal to 2;
   a second signal generating circuit configured to generate a second clock signal of the n-th period according to the control signal of the n-th period and the input signal of the n-th period;
   an output circuit configured to output an output signal of the n-th period according to the first clock signal of the n-th period and the second clock signal of the n-th period; and
   a control circuit configured to process an initial control signal of the n-th period to obtain the control signal of the n-th period according to a reference value, the reference value comprising a logic level of an output signal of (n−1)-th period,
   wherein a probability that the logic level of the output signal is a first logic level is 0.5, a probability that the logic level of the output signal is a second logic level is 0.5, and the first logic level and the second logic level have opposite logics.

2. The physically unclonable functional device according to claim 1, wherein:
   the first signal generating circuit comprises a first time-average-frequency direct period synthesis (TAF-DPS) circuit, and the second signal generating circuit comprises a second TAF-DPS circuit; and
   the control signal comprises a control word, and the initial control signal comprises an initial control word.

3. The physically unclonable functional device according to claim 2, wherein:
   the initial control word is C=F+r, where F is an integer, and r is a decimal greater than 0 and smaller than 1; and
   the control word of the n-th period is C(n) which is obtained by performing a mathematical operation on the reference value and at least one of F or r.

4. The physical unclonable function device according to claim 3, wherein each of the first clock signal and the second clock signal has a first period with a probability of r and a second period with a probability of 1−r, the first period is F+1, and the second period is F.

5. The physical unclonable function device according to claim 3, wherein C(n)=M+N, where M is one of F and r, and N is obtained by performing the mathematical operation on the reference value and the other of F and r.

6. The physical unclonable function device according to claim 5, wherein M is F, and N is obtained by performing the mathematical operation on the reference value and r.

7. The physically unclonable function device according to claim 6, wherein the mathematical operation comprises a multiplication operation.

8. The physically unclonable functional device according to claim 7, wherein:
   $N=\Sigma_{i=1}^{m} B_{\lfloor A(n-i) \rfloor} \cdot r_i$, where m is a number of digits of r after decimal point, $r_i=0 \cdot p$, p is the last i digits in r, and $B_{\lfloor A(n-i) \rfloor}$ represents a logic level of an output signal of (n−i)-th period; and
   in a case where n−i is smaller than or equal to 0, $B_{\lfloor A(n-i) \rfloor}=0$.

9. The physical unclonable function device according to claim 3, wherein r=0.5.

10. The physical unclonable function device according to claim 2, wherein each of the first TAF-DPS circuit and the second TAF-DPS circuit is configured to determine the input signal of the n-th period according to the control word of the n-th period.

11. The physically unclonable functional device according to claim 10, further comprising:
    a ring oscillator configured to generate K clock signals with a same frequency, wherein there is a same time interval between j-th clock signal and (j−1)-th clock signal, where K is an integer greater than or equal to 2, and j is any integer between 2 and K;
    the first TAF-DPS circuit comprising:
    a first accumulator configured to calculate an accumulated value A1(n) of the n-th period in the first accumulator according to following formula: A1(n)=(A1(n−1)+C(n))(mod K), where A1(n−1) is an accumulated value of (n−1)-th period in the first accumulator, C(n) is the control word of the n-th period, and C(n) is greater than or equal to 2 and smaller than or equal to 2K−1,
    a first multiplexer, and
    a first register configured to control the first multiplexer to select one of the K clock signals as the input signal of the n-th period according to an integer in A1(n); and
    the second TAF-DPS circuit comprising:
    a second accumulator configured to calculate an accumulated value A2(n) of the n-th period in the second accumulator according to following formula: A2(n)=(A2(n−1)+C(n))(modK), where A2(n−1) is an accumulated value of the (n−1)-th period in the second accumulator, A2(1)=A1(1), and A2(n)=A1(n),
    a second multiplexer, and
    a second register configured to control the second multiplexer to select the one of the K clock signals as the input signal of the n-th period according to an integer in A2(n),
    wherein there are positive integers q1 and f1 such that A1(q2) is constantly equal to A1(f2)(mod K), where f1 is greater than q1, and
    wherein there are positive integers q2 and f2 such that A2(q2) is constantly equal to A2(f2)(mod K), where f2 is greater than q2.

12. The physical unclonable function device according to claim 11, wherein A2(1)=A1(1), A2(n)=A1(n), f1=q1, and f2=q2.

13. The physically unclonable functional device according to claim 12, wherein:
    the control circuit is further configured to provide an initial value; and
    the first register and the second register are further configured to control the first multiplexer and the second multiplexer, respectively, to select a same one of the K clock signals as an input signal of the first period according to the initial value.

14. The physical unclonable function device according to claim 1, wherein:
    the first signal generating circuit is further configured to generate a first clock signal of a first period according to a control signal of the first period and an input signal of the first period;
    the second signal generating circuit is further configured to generate a second clock signal of the first period according to the control signal of the first period and the input signal of the first period; and the output circuit is further configured to output an output signal of the first period according to the first clock signal of the first period and the second clock signal of the first period.

15. The physical unclonable function device according to claim 1, wherein:

c-th rising edge of the first clock signal reaches the output circuit at a first time, and c-th rising edge of the second clock signal reaches the output circuit at a second time, where c is an integer greater than or equal to 1; and the output circuit is configured to determine a logic level of the output signal of the n-th period according to at least the first time and the second time.

16. The physically unclonable functional device according to claim 15, wherein:

(c+1)-th rising edge of the first clock signal reaches the output circuit at a third time, and (c+1)-th rising edge of the second clock signal reaches the output circuit at a fourth time; and the output circuit is configured to determine the logic level of the output signal of the n-th period according to a first difference between the third time and the first time, and a second difference between the fourth time and the second time.

17. The physically unclonable functional device according to claim 16, wherein:

in a case where the first difference value is greater than or equal to the second difference value, the logic level of the output signal of the n-th period is 1; and in a case where the first difference value is smaller than the second difference value, the logic level of the output signal of the n-th period is 0.

18. An electronic device, comprising the physical unclonable function device according to claim 1.

19. A physical unclonable function device, comprising:

a first signal generating circuit configured to generate a first clock signal of n-th period according to a control signal of the n-th period and an input signal of the n-th period, where n is an integer greater than or equal to 2;

a second signal generating circuit configured to generate a second clock signal of the n-th period according to the control signal of the n-th period and the input signal of the n-th period;

an output circuit configured to output an output signal of the n-th period according to the first clock signal of the n-th period and the second clock signal of the n-th period; and a control circuit configured to process an initial control signal of the n-th period to obtain the control signal of the n-th period according to a reference value, the reference value comprising a logic level of an output signal of (n−1)-th period, wherein:

the first signal generating circuit comprises a first time-average-frequency direct period synthesis (TAF-DPS) circuit, and the second signal generating circuit comprises a second TAF-DPS circuit; and the control signal comprises a control word, and the initial control signal comprises an initial control word, wherein the initial control word is C=F+r, where F is an integer, and r is a decimal greater than 0 and smaller than 1, and the control word of the n-th period is C(n) which is obtained by performing a mathematical operation on the reference value and at least one of F or r.

20. A physical unclonable function device, comprising:

a first signal generating circuit configured to generate a first clock signal of n-th period according to a control signal of the n-th period and an input signal of the n-th period, where n is an integer greater than or equal to 2;

a second signal generating circuit configured to generate a second clock signal of the n-th period according to the control signal of the n-th period and the input signal of the n-th period;

an output circuit configured to output an output signal of the n-th period according to the first clock signal of the n-th period and the second clock signal of the n-th period; and a control circuit configured to process an initial control signal of the n-th period to obtain the control signal of the n-th period according to a reference value, the reference value comprising a logic level of an output signal of (n−1)-th period, wherein:

c-th rising edge of the first clock signal reaches the output circuit at a first time, and c-th rising edge of the second clock signal reaches the output circuit at a second time, where c is an integer greater than or equal to 1, and the output circuit is configured to determine a logic level of the output signal of the n-th period according to at least the first time and the second time.

* * * * *

UNITED STATES PATENT AND TRADEMARK OFFICE
CERTIFICATE OF CORRECTION

PATENT NO. : 12,231,587 B2  
APPLICATION NO. : 17/788523  
DATED : February 18, 2025  
INVENTOR(S) : Xiangye Wei Page 1 of 1

It is certified that error appears in the above-identified patent and that said Letters Patent is hereby corrected as shown below:

In the Claims

Column 14, Line 34, Claim 11, delete "(modK)," and insert -- (mod K), --

Signed and Sealed this
Eighth Day of April, 2025

Coke Morgan Stewart
*Acting Director of the United States Patent and Trademark Office*